No. 635,857. Patented Oct. 31, 1899.
A. J. KAUTZ.
MACHINE FOR PRODUCING AND MAINTAINING FLUID MIXTURES.
(Application filed Feb. 18, 1899.)
(No Model.) 2 Sheets—Sheet 1.
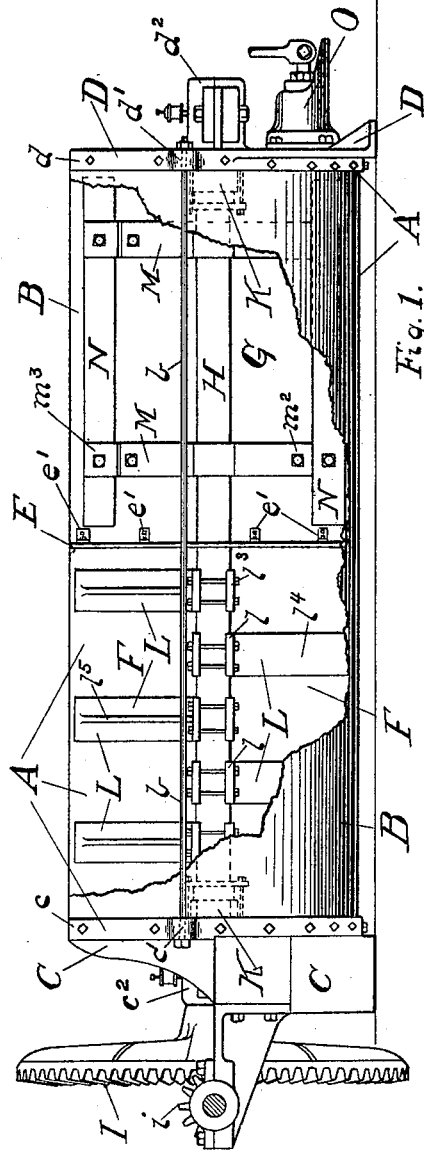
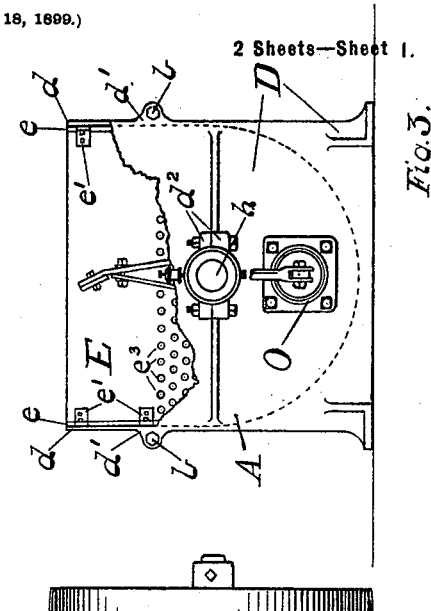
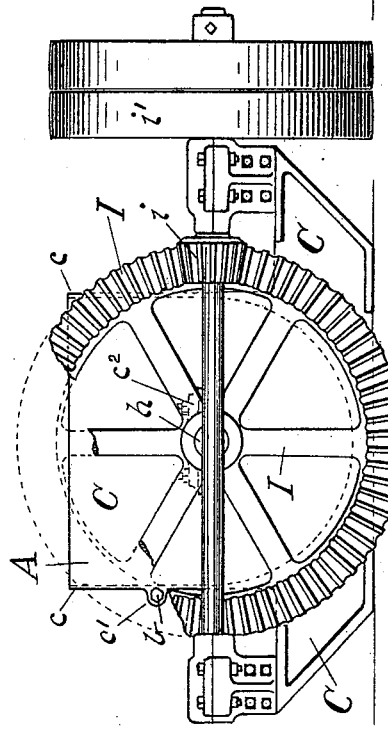
WITNESSES:
Howard M. Cox
Arthur M. Cox
INVENTOR
Andrew J. Kautz.
BY
ATTORNEY.
THE NORRIS PETERS CO., PHOTO-LITHO., WASHINGTON, D. C.

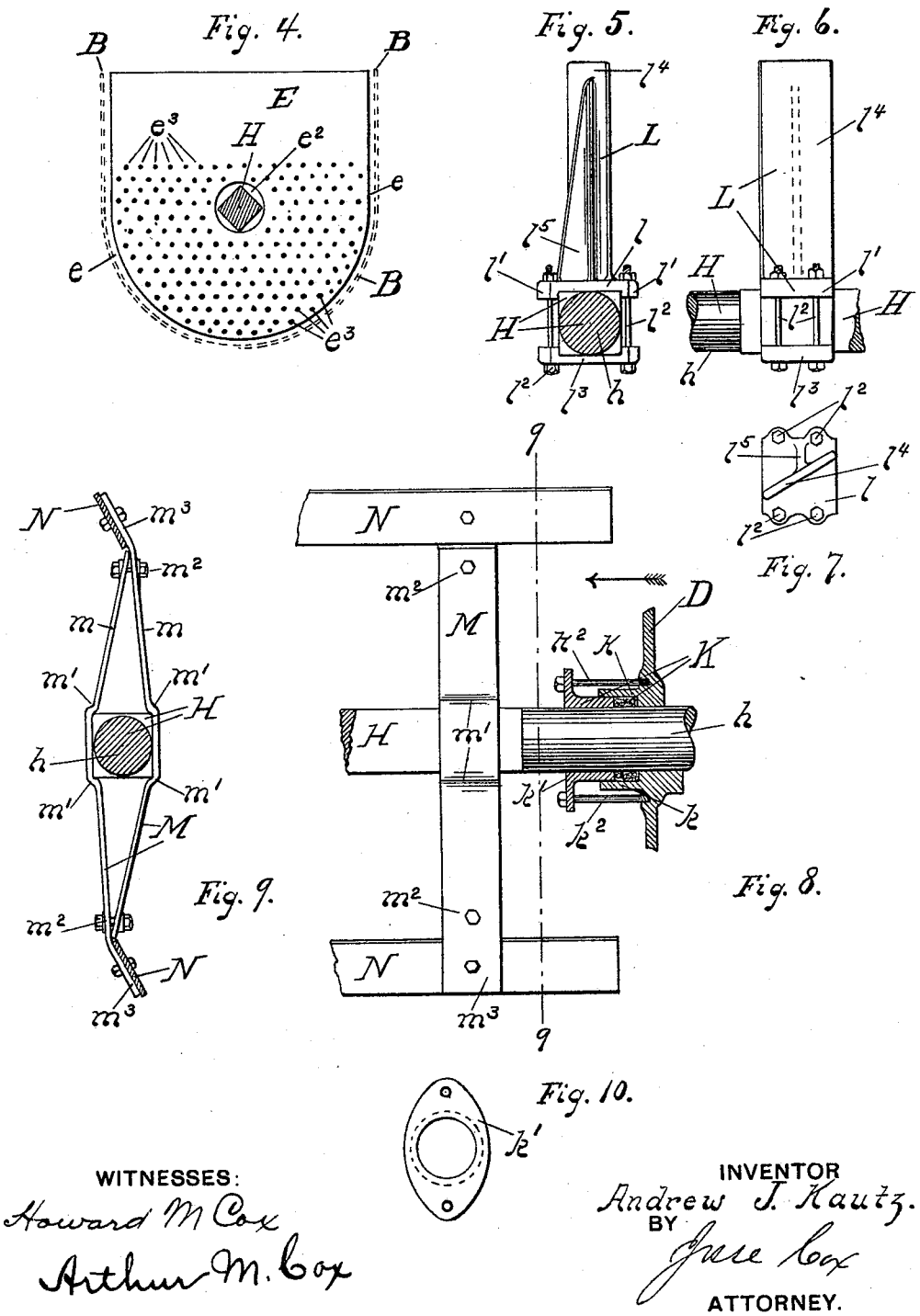

UNITED STATES PATENT OFFICE.

ANDREW J. KAUTZ, OF CHICAGO, ILLINOIS, ASSIGNOR TO THE CHISHOLM, BOYD & WHITE COMPANY, OF SAME PLACE.

MACHINE FOR PRODUCING AND MAINTAINING FLUID MIXTURES.

SPECIFICATION forming part of Letters Patent No. 635,857, dated October 31, 1899.

Application filed February 18, 1899. Serial No. 706,068. (No model.)

*To all whom it may concern:*

Be it known that I, ANDREW J. KAUTZ, a citizen of the United States, residing at the city of Chicago, in the county of Cook and State of Illinois, have invented a new and useful Improvement in Machines for Producing and Maintaining Fluid Mixtures, of which the following is a specification.

My invention relates to improvements in machines for producing and maintaining fluid mixtures; and the objects of my invention are, first, to provide adjacent to each other a mixing-chamber and a chamber in which the mixture produced in said mixing-chamber may be preserved in a homogeneous condition and the precipitation of any solid particles therein prevented until said mixture is discharged or removed; second, to provide means within said mixing-chamber whereby solids may be thoroughly mixed and commingled with or dissolved in liquids; third, to provide a strainer between said mixing and said second chamber, wherethrough a fluid mixture may pass, but whereby masses of solid matter are prevented from passing from said mixing-chamber to said second chamber; fourth, to provide means within said second chamber whereby the homogeneity and uniform consistency of the strained mixture may be preserved, and, fifth, to provide means whereby the solutions and fluid mixtures may be discharged from said second chamber. I attain these objects by the mechanism illustrated in the accompanying drawings, in which—

Figure 1 is a side view of the device, showing the driving-gear, the two chambers, part of the sides of which are broken away, and a portion of the pump. Fig. 2 is a view of the gear end of the device, showing the gears and the supporting end frame. Fig. 3 is a view of the pump end of the device, a section of the frame being broken away, showing a portion of the stirring-paddles and the strainer and also showing the discharge-pump. Fig. 4 is a view of the face of the strainer, showing the apertures therein and showing the position of the square main shaft and further indicating by dotted lines the position of said strainer relative to the tank. Fig. 5 is a side view of one of the mixer-teeth, showing the method of securing it to the main shaft. Fig. 6 is a front view of a mixer-tooth secured to a portion of the main shaft. Fig. 7 is a top view of a mixer-tooth. Fig. 8 is a side view of a portion of the stirring-paddles in position upon the main shaft and shows in section a portion of the end frame and the stuffing-box. Fig. 9 is a sectional view, taken on the line 9 9, Fig. 8, looking in the direction of the arrow, of the paddles and one of the paddle-arms. Fig. 10 is an end view of the stuffing-box gland.

Similar letters refer to similar parts throughout the several views.

The tank A, consisting of the tank-body B and the supporting end frames or standards C and D, is divided by the strainer E into the two adjacent chambers F and G. Said tank-body B consists, preferably, of a U-shaped sheet of tank-steel, open at the top, as shown. Said standards C and D are provided with the flanges $c$ and $d$, respectively, whereby said tank-body B is attached to said end frames. Said tank A is braced by the stay-rods $b\ b$ on the outside of the tank A, which extend the entire length thereof and are supported by the lugs $c'\ c'$ and $d'\ d'$ in said frames C and D, respectively. Extending longitudinally through said tank A is the main shaft H, which is square except at the extremities $h\ h$ thereof, where it is supported by the bearings $c^2$ and $d^2$ in the end frames C and D, respectively. Said shaft is rotated by the bevel gear-wheel I, actuated by the pinion $i$ and tight pulley $i'$ or in any other suitable manner. The bearings $c^2$ and $d^2$ are provided with the stuffing-boxes K K, said boxes being of the ordinary pattern and consisting of the chamber or box $k$, into which the sleeve or gland $k'$ is forced by means of the bolts $k^2\ k^2$. The strainer E is placed transversely within said tank A, about midway between the extremities thereof, and is so formed as to follow the contour of said tank, but to leave a small space $e$ between the edge of said strainer E and the body B of said tank A, as shown in Fig. 4. Said strainer E is attached to said tank by means of the lugs $e'\ e'$ and has an aperture $e^2$ so placed as to permit the shaft H to rotate therein. Said strainer E is perforated from its lower extremity upward to a point beyond the aperture $e^2$, as shown in Figs. 3 and 4, some of which perforations are marked $e^3$. By means of said space $e$ and perforations $e^3$ the passage of a fluid through and around said strainer E is permitted, but the similar passage of masses of solid matter is prevented.

Attached to the shaft H and within the chamber F are the crushing and mixing teeth or blades L L, sufficient in number to fill said chamber F and extending from said shaft alternately in opposite directions. Each of said teeth L has a base $l$, with flanged edges $l'$ $l'$ fitting over said shaft H and being attached thereto by means of the bolts $l^2$ $l^2$. Said bolts $l^2$ $l^2$ engage with a plate $l^3$ similar in form to said base $l$ of tooth L and placed against the shaft H on the side thereof opposite to said tooth L. Rising perpendicularly from said base $l$ of tooth L is the face $l^4$ of said tooth, set obliquely to the axis of the shaft H and strengthened by the web $l^5$. Said obliquity of the faces $l^4$ causes the teeth L when revolving within and through material to impart thereto simultaneously a forward and a lateral motion, thereby increasing the grinding and mixing effect upon said material. The length of teeth L is such that they will just clear the tank-body B when revolving in position upon the shaft H.

Within the chamber G and transversely attached to the shaft H are the paddle-arms M M, consisting of the strips $m$ $m$, offset at the points $m'$ $m'$ thereon to partially conform to and engage said shaft H on opposite faces thereof. Said strips $m$ are fastened together at the points $m^2$ $m^2$, near their extremities, thus forming a trussed arm and affording maximum stiffness and rigidity with minimum weight. Transversely attached to said arms M M, at the extremities $m^3$ $m^3$ thereof, are the paddles or floats N N, so placed that they approach when revolving to within a short distance of the tank-body B. Said extremities $m^3$ of arms M are so bent that the faces of the paddles N, attached thereto, lie obliquely to the direction of the length of said arms M, but in a plane parallel to the axis of the shaft H. By being thus set obliquely the paddles N when revolved in the proper direction tend to simultaneously impart a lateral and an upward motion to material at and near the bottom of the chamber G.

The pump O, of the ordinary plunger type, is bolted to the frame D, on the outer side thereof, in such a position as to communicate with the lower portion of the chamber G, and furnishes means for withdrawing and discharging the contents of said chamber.

In the operation of the machine the shaft H, carrying in their respective chambers the teeth L, paddle-arms M, and paddles N, is rotated by means of the bevel-gear I. The material to be dissolved or mixed is placed within the chamber F, together with the liquid in which it is to be dissolved or with which it is to be mixed, and the revolving mixer-teeth L crush and grind masses of the solid material upon each other and upon the bottom and sides of the chamber F and cause the liquid to come thoroughly into contact with and disintegrate and dissolve said material. The liquid carrying the finely divided or dissolved particles of said material passes freely through and around the strainer E, leaving behind all solid masses, and enters the chamber G, where the revolving paddles N N agitate the fluid and cause it to become thoroughly homogeneous and of uniform consistency. Said obliquely-set revolving paddles N force upward any particles of matter which may tend to form a precipitate in the chamber G, and thus the homogeneity of the fluid is preserved until said fluid is withdrawn from said chamber G. As fluid may readily pass in either direction through the strainer E when the machine is in operation, the effect of any temporary variation in the proportions of materials in the chamber F will be quickly spread throughout the entire contents of the tank, and the effect of such variation will be thereby lessened. If ordinary care is exercised in introducing fresh material into the chamber F, the strength and consistency of the fluid in the chamber G will be substantially uniform.

It will be observed that my machine may produce a true solution, or it may produce a mixture consisting of particles of an insoluble solid suspended in a liquid, or it may produce both a solution and a mixture, even though both solid and liquid are of single kinds, chemically pure, and the solid is soluble in the liquid, as may be the case when a solid is introduced into a liquid in quantities more than sufficient to produce a saturated solution.

Although the tank A is shown open at the top, it is evident that the form of the tank may be varied without departing from my invention.

What I claim as new, and desire to secure by Letters Patent, is—

1. The combination of a tank, a perforated partition therein dividing said tank into two compartments; a shaft extending through said tank; crushing and mixing teeth on said shaft within one of said compartments; paddles or floats in the other of said compartments adjacent to the outlet of said tank, said paddles or floats extending in a direction parallel to the sides and bottom of said tank, and approaching closely thereto; paddle-arms for attaching said paddles or floats to said shaft; an outlet in said tank at or near the bottom thereof and adjacent to said paddles or floats; and means for rotating said shaft.

2. In a machine for producing and maintaining fluid mixtures the combination of a tank having two compartments therein, a shaft extending horizontally through said tank, a mechanism for rotating said shaft, an outlet in one of said compartments, crushing and mixing teeth or blades attached to said shaft in one of said compartments, paddles or floats in the other of said compartments adjacent to said outlet, paddle-arms for attaching said paddles or floats to said shaft, and a perforated strainer within said tank, having a space between the edge of said strainer and the bottom and sides of said tank, said strainer dividing said tank into the said two compartments.

3. In a machine for producing and maintaining fluid mixtures the combination of a tank, a square shaft extending through said tank; a mechanism for rotating said shaft; a perforated strainer within said tank dividing said tank into two compartments; crushing and mixing teeth or blades attached to said shaft in one of said compartments; paddles or floats in the other of said compartments, said paddles or floats extending in a direction parallel to the sides and bottom of said tank and approaching closely thereto; an outlet at or near the bottom of said tank in the compartment thereof containing said paddles or floats, and trussed paddle-arms consisting of strips offset at said shaft and engaging said shaft on the opposite faces thereof, said strips being fastened together near their extremities, and said paddle-arms carrying said paddles or floats.

ANDREW J. KAUTZ.

Witnesses:
HOWARD M. COX,
MARY BACHMAN.